Patented Aug. 26, 1941

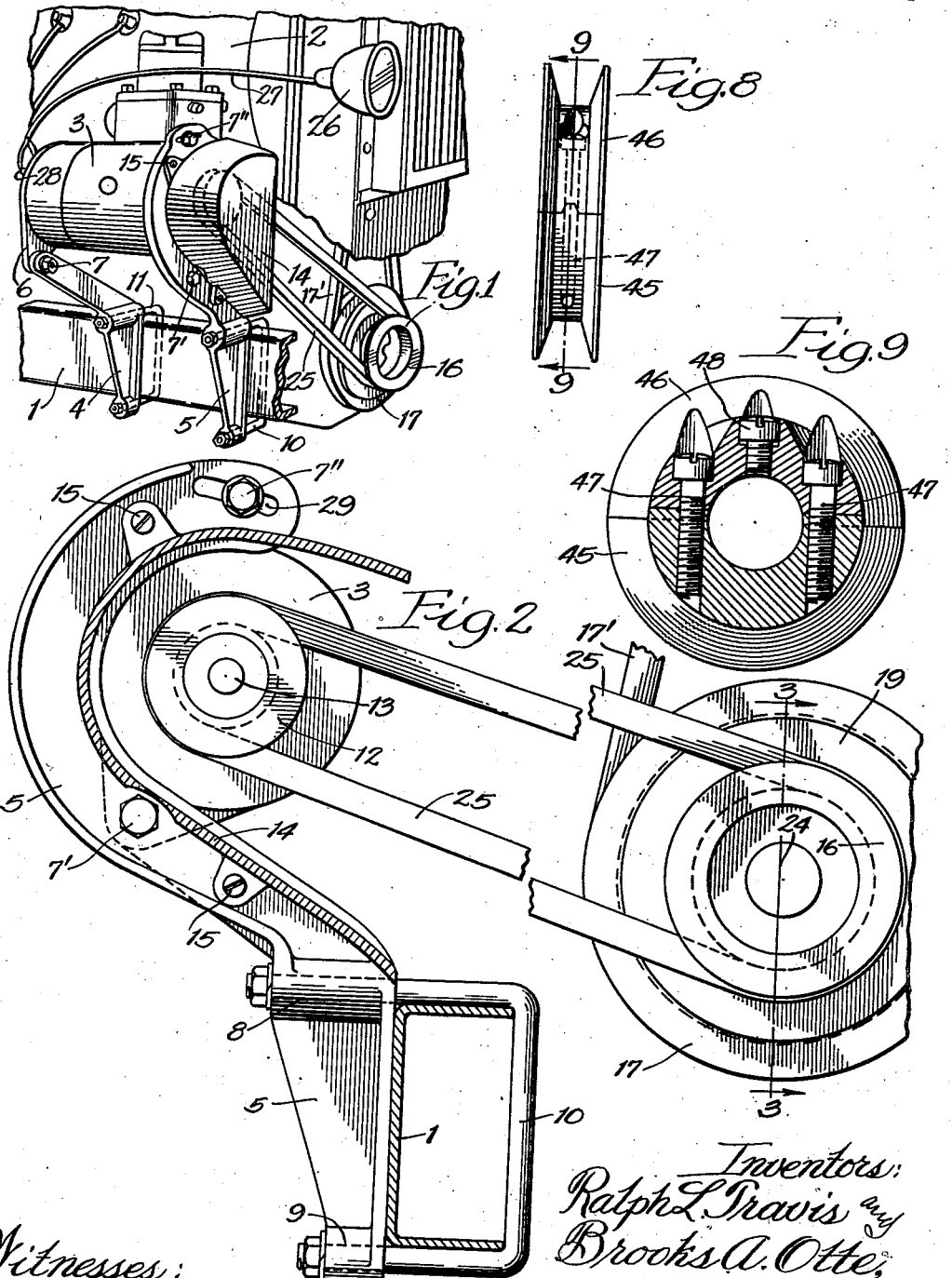

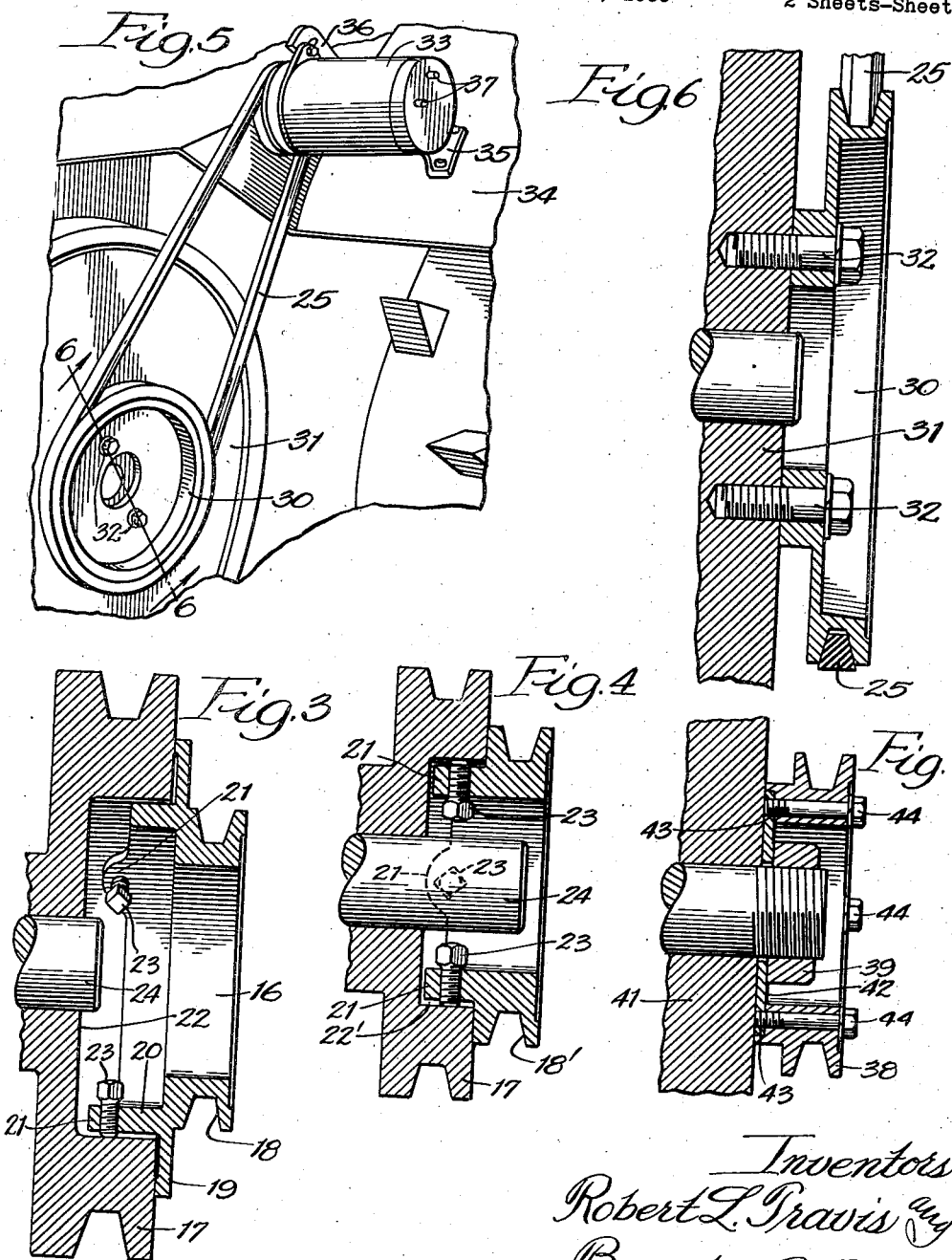

2,253,591

UNITED STATES PATENT OFFICE 2,253,591

PULLEY

Ralph L. Travis and Brooks A. Otte, Sidney, Iowa, assignors to Monteith Bros. Inc., Elkhart, Ind., a corporation of Indiana Application February 27, 1939, Serial No. 258,686

2 Claims. (Cl. 74—230.1)

This invention relates to improvements in lighting units for farm tractors and the like.

Heretofore farm tractors have not been equipped with lights thereby necessitating the discontinuance of their use after darkness has set in; therefore, the main objects of this invention are to provide a lighting unit for a farm tractor; to provide a lighting unit which may be adapted to substantially all farm tractors now in use regardless of their make; to provide on a farm tractor suitable brackets and pulleys for supporting adjustably and operating a generator to energize a lamp; to provide new and improved drive pulleys for connection to a tractor motor; and to provide a device of this kind with a minimum amount of parts which is easy to install, simple in construction and operation, and inexpensive to manufacture and operate.

Illustrative embodiments of the invention are shown in the accompanying drawings, in which:

Figure 1 is a perspective view of my new lighting unit shown attached to the front end of a tractor.

Fig. 2 is a front view of the same, with the radiator of the tractor and the generator pulley guard removed.

Fig. 3 is a cross sectional view taken on the line 3—3 of Fig. 2.

Fig. 4 is a cross sectional view of a modified form of the drive pulley.

Fig. 5 is a perspective view of another modified form of a drive pulley.

Fig. 6 is a cross sectional view taken on the line 6—6 of Fig. 5.

Figs. 7, 8 and 9 are other modified forms of drive pulleys.

Referring in detail to the preferred embodiment shown in Figs. 1, 2 and 3 of the drawings, my tractor lighting unit is arranged to be attached to the chassis frame 1 of a tractor adjacent the front end thereof so as to be in close proximity to the front end of the motor 2. A generator 3 of the usual automobile type is secured to the frame 1 by means of adjustable brackets 4 and 5. The upper end of the bracket 4 is pivotally secured to the end plate 6 of the generator by any suitable means such as by bolt 7 or the like. The upper end of bracket 5 is secured to front end of the generator by any suitable means such as by bolts 7' and 7''. The lower ends of the brackets 4 and 5 are each provided with a pair of spaced apertures 8 and 9 and each is positioned against the outer face of the chassis frame 1 in spaced relation to each other and in the manner shown in Fig. 1.

The brackets 4 and 5 are each secured to the chassis frame 1 by any suitable means, such as by U-bolts 10 and 11 and in the manner shown in Figs. 1 and 2.

A driven pulley 12 is secured to the generator shaft 13 at the forward end of the generator 3 and a cap or guard 14 is placed thereover and is anchored to the upper end of bracket 5 by any suitable means such as by machine screws 15 in the manner shown in Figs. 1 and 2.

A drive pulley 16 of special design is mounted on the fan drive pulley 17 in the manner shown in Fig. 3. The pulley 16 comprises a grooved annular rim 18, a wide-flanged member 19 arranged to lie against the outer face of the fan drive pulley, and a collar 20 having outwardly extending internally-threaded lugs 21. The collar 20 is adapted to be fit in the annular concentric recess 22 of the fan drive pulley 17 and the drive pulley 16 secured therein by means of machine screws 23. The fan drive pulley 17 is secured to the crank shaft 24 in the usual manner and is equipped with the usual fan belt 17'. A pulley belt 25 is placed between the pulleys 12 and 16.

An extension light of the usual type comprising a lamp 26 having a socket and bulb (not shown) and an electric cord 27 is also provided with this unit. One end of the cord 27 is attached to terminal posts 28 of the generator 3 and the other end to the lamp socket. The lamp 26 may then be attached by means of any suitable type of bracket to the front or rear or to both ends of the tractor.

In assembling and mounting the unit on the tractor chassis 1 the generator is first loosely secured to the brackets 4 and 5 and the driven pulley 12 attached to the generator shaft 13. The brackets 4 and 5 are then loosely mounted to the chassis frame. Next the drive pulley 16 is mounted on the fan drive pulley 17 and the pulley 12 aligned therewith, with the belt 25 in position therebetween, by shifting the brackets 4 and 5 along the frame 1. The U-bolts 10 and 11 are then tightened. The generator is then shifted laterally to take up any slack in the pulley belt 25 and the screws 7, 7' and 7'' tightened. Lateral adjustment of the generator can be effected at any time because the screws 7 and 7' act as pivots and the screw 7'' seated in the arcuate slot 29 in the upper end of bracket 5, as the locking medium after shifting the generator to the desired position. The guard or cap 14 is then placed over the pulley 12 and the device is ready for operation.

Cutouts, ammeters, batteries or switches are not employed in our lighting unit.

The modified construction of the drive pulley shown in Fig. 4 is practically the same as the pulley shown in Fig. 3 with the exception that the flange 19 is eliminated. In this construction the pulley is adapted for attachment to a different model but to the same type of farm tractor as is illustrated in Fig. 1. In this model of farm tractor the fan drive pulley has a smaller annular concentric recess 22, thereby providing for a bearing surface against which the inner face of the grooved rim 18' may bear. It is to be noted that the diameter of the grooved rim 18' is substantially identical to that of the rim 18 of the device of Fig. 3.

In the modified construction shown in Figs. 5 and 6 the drive pulley 30 is secured directly to a fly wheel 31 of the motor 2 by means of set screws 32. The generator 33 is secured to some portion of the tractor such as the fender 34 by suitable brackets 35 and 36. The wires of the electric extension cord (not shown) are secured to the terminal posts 37.

In the modified construction of the drive pulley 38, shown in Fig. 7, this arrangement is adapted to be used on still another type of farm tractor wherein a nut 39 secures the crankshaft 40 to the fly wheel 41. In this construction a steel plate 42 is substituted for the usual washer and is provided with internally-threaded apertures 43. The pulley 38 is also provided with apertures through which set screws 44 are inserted and then threaded into the internally-threaded apertures 43 of the plate 42 to secure the pulley to the crank shaft 40.

In the modified form of pulley shown in Figs. 8 and 9 this arrangement is adapted to be used on still another type of farm tractor. This form of pulley is of the split type and is arranged to be placed directly back of the fan on the fan shaft and comprises two halves 45 and 46 held together by screws 47. It will be apparent that with this type of pulley it is not necessary to remove the fan, it being only necessary to split the pulley, place it on the fan shaft between the motor block and the fan, and then tighten the set screw 48.

A 32 volt, 150 watt lighting system is obtained by using the lighting unit of the present invention. This unit will furnish abundant light for all tractor operations under any and all conditions. The generator and lamp may be attached to substantially any part of the tractor. A long extension cord may also be employed to use the lighted lamp a distance of substantially a hundred feet away from the tractor. This increases the uses of the unit and makes it adaptable for many jobs where six and twelve volt lighting systems would be impractical due to line loss.

It is to be understood that some of the details set forth may be altered or omitted without departing from the spirit of the invention as defined by the appended claims.

We claim:

1. A compound pulley device of the class described comprising a pair of pulleys, one being adapted for mounting on a shaft and having an overhanging belt flange and the other being hollow and having a flange to extend freely within said belt flange, and radially disposed bearing screws distributed about and carried by the second said flange to bear outwardly against the first said flange for coaxially aligning said pulleys.

2. In a device of the class described a cylindrically flanged belt pulley having a belt supporting annular attachment adjustably movable in a plane parallel with the virtual plane of said pulley, said attachment comprising a cylindrical supporting part and a parallel belt receiving part, which supporting part is adapted to fit laterally and loosely within said pulley and also has a radial flange to bear sidewise rigidly against the flange of said pulley, and radial screw means to center said attachment and lock the same in place with the said flanges in bearing contact with each other.

RALPH L. TRAVIS.
BROOKS A. OTTE.